June 22, 1926. 1,590,147
J. A. BAUER
CENTRAL STATION FOR DISPATCH SYSTEMS
Filed April 6, 1923 3 Sheets-Sheet 1
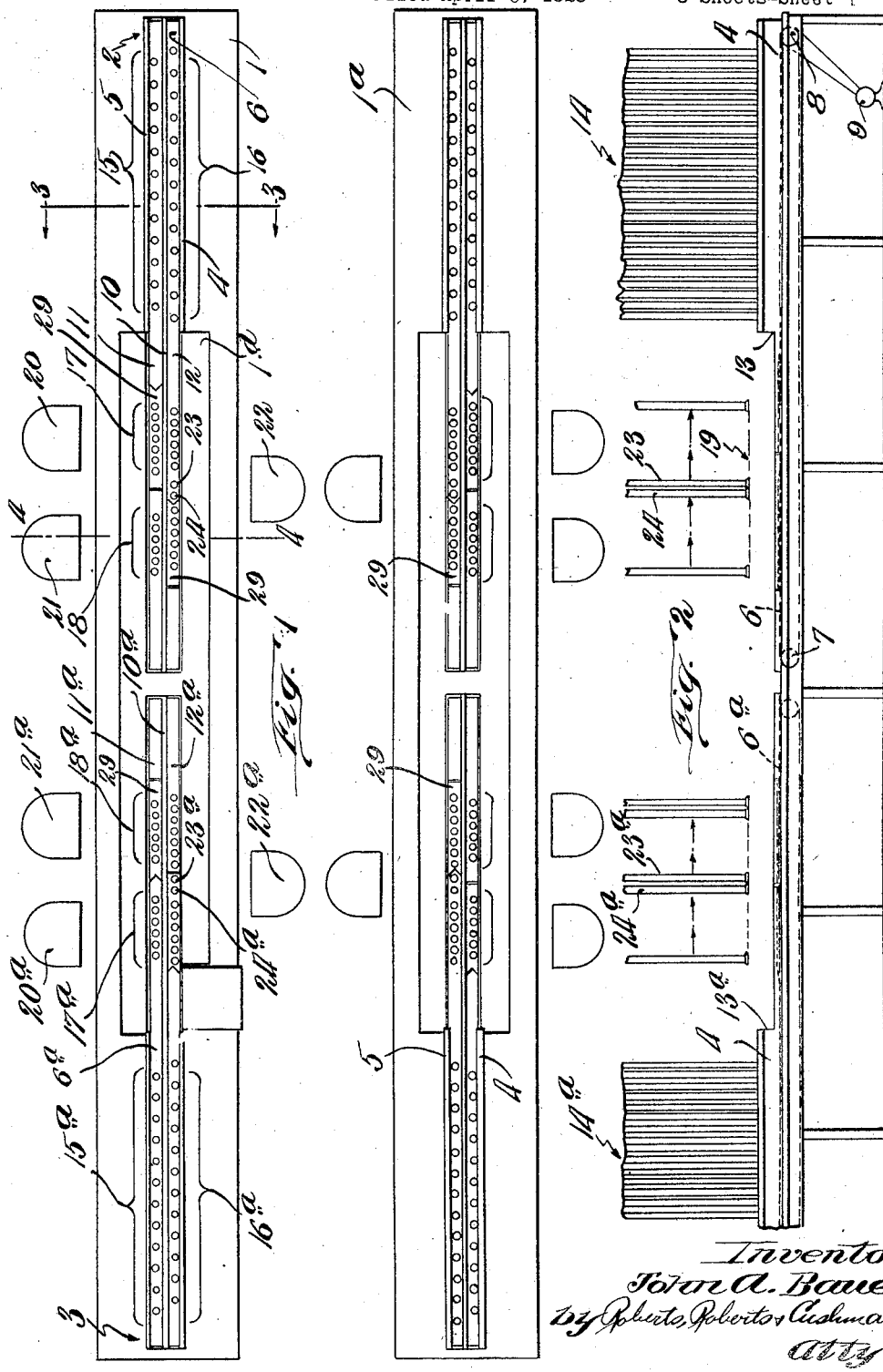

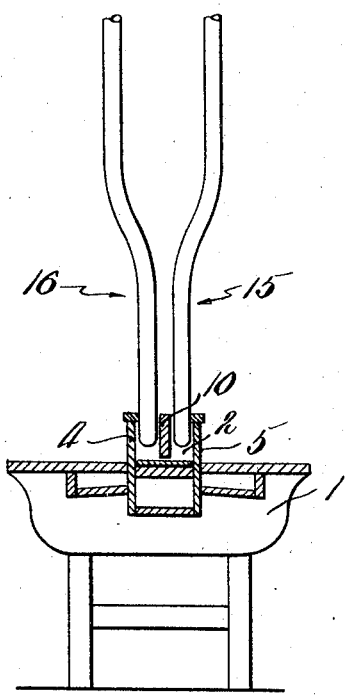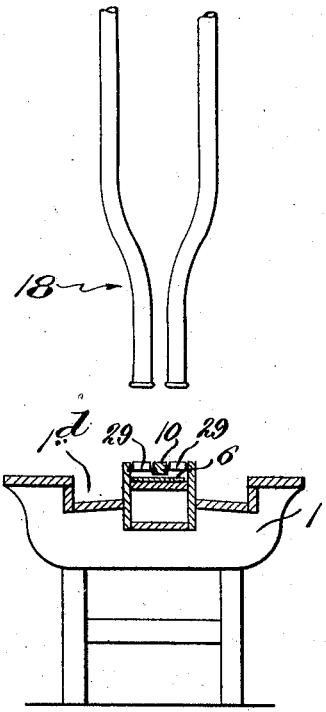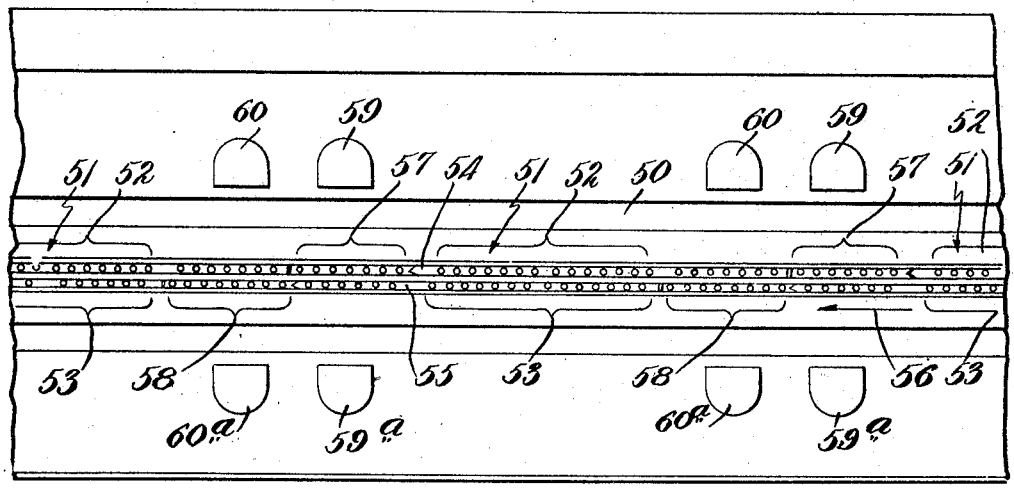

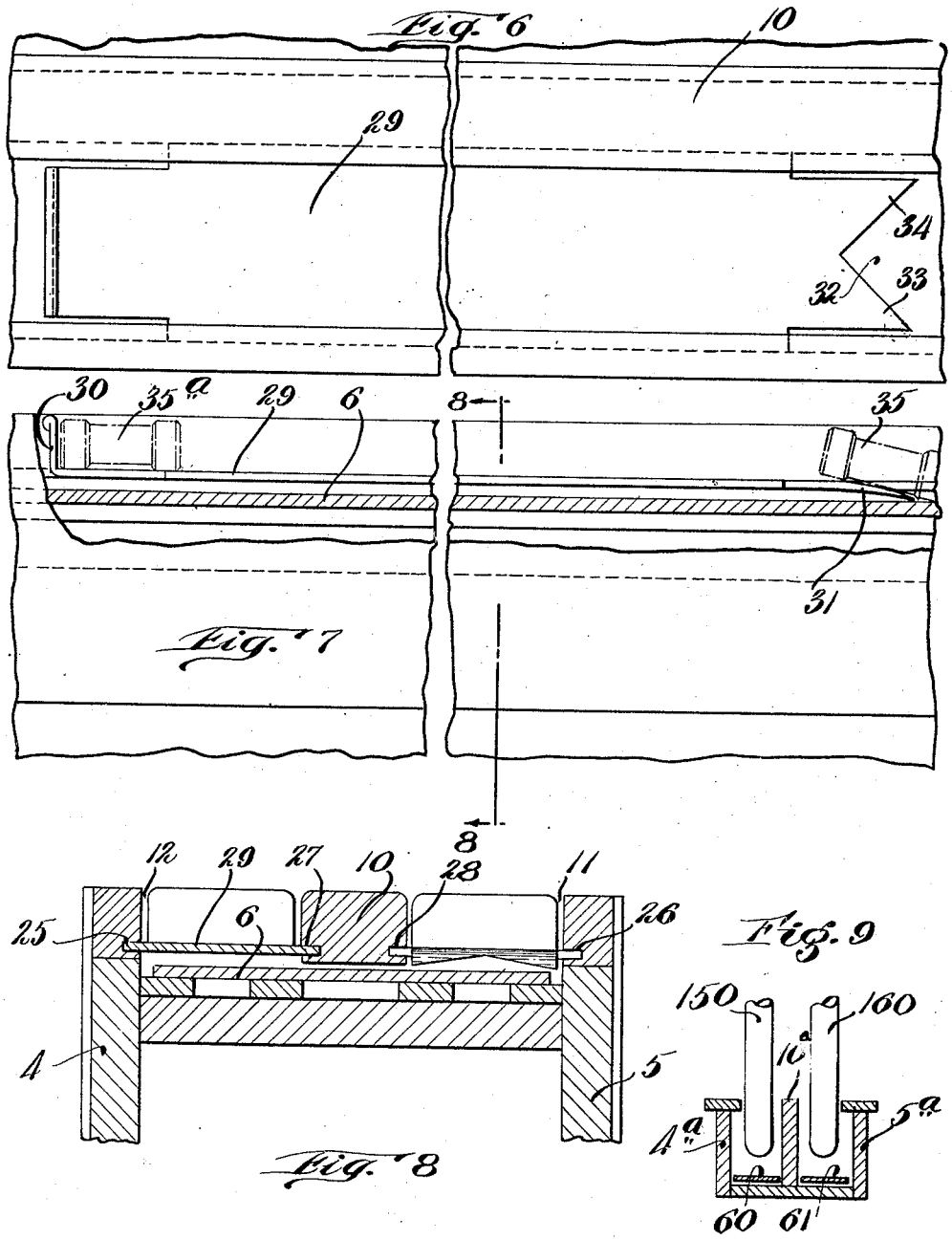

Patented June 22, 1926.

1,590,147

UNITED STATES PATENT OFFICE.

JOHN A. BAUER, OF SYRACUSE, NEW YORK, ASSIGNOR TO THE LAMSON COMPANY, OF SYRACUSE, NEW YORK, A CORPORATION OF MASSACHUSETTS.

CENTRAL STATION FOR DISPATCH SYSTEMS.

Application filed April 6, 1923. Serial No. 630,252.

This invention pertains to central station apparatus useful in carrier dispatch systems designed for the transmission of carriers for merchandise, papers, money, etc., to a central point from any of a plurality of outlying stations and their return to the respective sending points after removal, exchange, or inspection of their contents. For purposes of illustration the present invention is herein disclosed as embodied in the central or cashiers's station of a carrier dispatch system of the pneumatic type such as is commonly employed in mercantile establishments, and in which the carriers are transmitted through tubes by air pressure or suction.

In some establishments where space is limited and particularly where there is little head room in the place available for the installation of the central station apparatus, it has been found somewhat difficult conveniently to install carrier separating devices of usual construction. Moreover, in certain places, as for example department stores, and the like, the volume of business fluctuates to a very marked degree from day to day and even from hour to hour, and the number of transactions to be performed at the central station may at times become so small that a single operator at each unit of the central station apparatus could take care of all cash and credit carriers, both in performing the necessary transactions with relation to the contents thereof, and also in returning the carriers to their respective sending stations, provided the incoming carriers of all kinds could be delivered at the station of such single operator and the corresponding sending terminals could likewise be brought within her easy reach.

Any modification of old structure or any new apparatus designed to permit the transaction of the several operations by a single operator, when the amount of business permits, should not preclude or interfere with the efficient employment of any desirable number of operators when the normal volume of business is resumed, nor the employment of independent operators for performing cash and credit transactions, if the amount of business, or the character of the transactions, necessitate such a division of duties.

Principal objects of the present invention are to provide for the efficient receipt and return of all carriers arriving at each unit of the central station by a single operator up to the limit of such operator's capacity; or, with substantially the same efficiency, by a larger number of operators, as the volume of business may demand; and to provide new central station apparatus useful in attaining this and other advantages, and which is capable of installation in places where head room and floor space are restricted, whose capacity may readily be increased from time to time in accordance with the growth of the business, and of such a character and arrangement as to permit and to facilitate supervision of the operators when several are employed. A further object is to provide for the convenient dispatch of credit carriers to a more or less remote authorizer's station if desired, and their return to the central station operator for transmission to the proper sending station.

In the accompanying drawings illustrating apparatus embodying the present invention:—

Fig. 1 is a plan view, partly in section, of a central station apparatus for carrier dispatch systems illustrating a preferred embodiment of the present invention;

Fig. 2 is a fragmentary side elevation of the apparatus shown in Fig. 1;

Fig. 3 is a fragmentary section on the line 3—3 of Fig. 1;

Fig. 4 is a fragmentary section on the line 4—4 of Fig. 1;

Fig. 5 is a fragmentary plan view, partly in section, illustrating a modified form of apparatus;

Fig. 6 is a fragmentary plan view to larger scale illustrating a carrier arresting device forming an element of the present invention;

Fig. 7 is a fragmentary side elevation, partly in section, showing the device illustrated in Fig. 6;

Fig. 8 is a vertical cross section to larger scale, substantially in the plane of the line 4—4 of Fig. 1, but omitting certain of the parts illustrated in the latter figure; and Fig. 9 is a fragmentary vertical section similar to Fig. 3, omitting certain parts and illustrating a modification.

In Fig. 1 the central station apparatus is illustrated as comprising a pair of spaced and substantially parallel desk units 1, 1ª respectively, it being understood however that such desk units need not necessarily be parallel and that a greater or less number may be employed as occasion may warrant and as growth of the business may demand. These desk units are of substantially like construction, each comprising two complete units or repeats of the delivery and dispatch apparatus, and it is therefore sufficient to describe desk unit 1 specifically. From one or both ends of the desk an elongate trough extends toward its central portion. In the preferred arrangement, troughs 2, 3 extend from opposite ends, respectively, of the desk. These troughs have substantially vertical side walls 4, 5 (Fig. 3) and movable floors which, in the preferred construction consist of the upper runs 6, 6ª of endless belts passing about pulleys such as 7, 8 and supported at their intermediate parts in any desired manner. These belts are driven by motors 9 (Fig. 2) disposed at the lower part of the desk, or by any other convenient means so that the two belts move in opposite directions toward the center of the desk. Each of the troughs 2, 3 is divided by a separator or partition 10, 10ª respectively into two substantially parallel channels or paths 11, 12; 11ª, 12ª respectively. The separator or partition is spaced slightly from the upper surface of the belt so as to permit the free movement of the latter along the trough. The side walls of the trough are cut down, inwardly from the points 13, 13ª, to permit the ready removal of carriers resting upon the belt by an operator positioned, for example, at 20, 22, 21ª, etc., at either side of the desk adjacent to its central portion.

At opposite ends of the desk, banks of carrier delivery terminals 14, 14ª respectively are arranged. The bank 14 preferably comprises two substantially parallel rows 15, 16 of terminals, the terminals of the respective rows delivering their carriers into the channels 11, 12 respectively. The bank 14ª likewise comprises two substantially parallel rows 15ª, 16ª of terminals so disposed that all carriers, both cash and credit, arriving through the terminals of the respective rows are delivered into the channels 11ª, 12ª respectively. The central portion of the desk is depressed at 1ᵈ in the usual manner to provide a space or receptacle for the cashier's tills or for other necessary auxiliary apparatus.

At the central portion of the desk where the sides of the troughs are relatively low, banks of return or dispatch terminals are arranged. Two such banks 17, 18 are associated with trough 2, while similar banks 17ª, 18ª are associated with trough 3. The dispatch terminals of banks 17 and 18 correspond to the same outlying stations as the delivery terminals of rows 15, 16, respectively, while the banks 17ª, 18ª of dispatch terminals correspond to the rows 15ª, 16ª of delivery terminals.

The terminals of these banks end, as indicated by the line 19, Fig. 2, at some distance above the upper surfaces of the belts so that carriers can conveniently be introduced into the terminals for return to the sending stations without disturbing the belt conveyed stream of carriers. Operators' stations 20 and 21 are disposed opposite to the banks 17 and 18 of terminals respectively. While seats or stations for operators are illustrated at the same side of the desk, it is contemplated that the stations may be arranged differently, as upon the opposite sides of the desk, and that one or more additional seats or stations such as 22 may be occupied by operators upon the opposite side from stations 20 and 21. The number of operators working at the desk is thus determined within limits only by the state of activity in the system. Corresponding operators' stations 20ª, 21ª and 22ª are associated with the banks of terminals 17ª, 18ª.

The several operators' stations may be arranged to accommodate a single operator or a plurality of operators as may be desired, the term "station" herein referring to any of the permitted places at which it is most convenient for the operator to serve.

Between adjacent ends of the banks of terminals 17, 18 one or more auxiliary delivery terminals 24 are preferably arranged, and likewise corresponding dispatch terminals 23. These auxiliary terminals connect with suitable transmission devices leading to a charge authorizer's station at a point more or less remote from the desk, and under some circumstances, as will hereinafter be more fully described, all charge carriers arriving at the central station may be dispatched through the tube 23 to such an authorizer's station and returned through the tube 24 for delivery to the sending station by the operator at the central station. While the terminals 23, 24 are referred to as independent of the banks 17, 18, they may in a physical sense constitute unitary parts of such banks of terminals, if desired, being designated by suitable indicia so that the operators may readily determine which of the several terminals leads to the charge authorizer's desk. Similar auxiliary terminals 23ª, 24ª are associated with the banks 17ª, 18ª of dispatch terminals.

For the purpose of providing for the orderly stoppage of arriving carriers in convenient position to be grasped by the operators, upper portions of the side walls 4, 5 of the trough (Figs. 6, 7 and 8) are provided with longitudinally extending grooves 25, 26 respectively; while the partition or divider 10 is likewise provided with grooves 27, 28. These grooves form guides for the opposite edges of slidable, carrier receiving and retaining devices or shelves 29 preferably formed of sheet material, and of a width such that their edges may slide freely in the grooves in the opposite walls of the respective channels. At one end, each of the shelves is provided with an up-turned portion or flange 30 forming a stop shoulder to prevent escape of a carrier resting upon the shelf. The opposite end of the shelf, that is to say, that end which is directed toward approaching carriers, is bent downwardly at 31, and terminates slightly above the upper surface of the belt. This downwardly deflected portion of the shelf is preferably bifurcated by a notch 32 defining spaced tongues 33, 34. The notch serves to center a carrier 35 as the latter rides up the inclined portion of the shelf onto a horizontal part of the latter. When the carrier reaches the horizontal part of the shelf it comes to rest but may be pushed along by succeeding carriers until it engages the stop member 30.

In Fig. 5, a modified arrangement is illustrated in which the desk is indicated at 50. At intervals along the desk banks of delivery terminals 51 are arranged, each of such banks comprising two substantially parallel rows 52, 53 of terminals. The desk is furnished as in the aforesaid arrangement with a trough extending longitudinally thereof, and this trough is divided by a central partition into parallel channels 54, 55. In this instance a single belt extends the full length of the desk, being moved continuously in the direction indicated by the arrow 56. This belt forms the floor of the channels 54, 55 and moves carriers delivered from the several banks 51 of terminals in the direction indicated by the arrow. In the intervals between the banks 51, banks 57, 58 of dispatch terminals are arranged. Each bank 57 corresponds for example to the row of terminals 52 of a bank 51, while each bank 58 of dispatch terminals corresponds to the terminals 53 of a bank 51. The banks 57, 58 are of less longitudinal extent than the rows of delivery terminals 52, 53, and may comprise two or more rows as desired, it being desirable that each of the banks of dispatch terminals be of a longitudinal extent such that an operator seated opposite the bank may reach the most remote terminals at the right and left of such bank.

Upon opposite sides of the desk, as illustrated in this view, operators' stations 59, 59ª are disposed in the neighborhood of the bank 57 of dispatch terminals, while operators' stations 60, 60ª are disposed at opposite sides of each bank 58. When space permits, a long desk of this character may be employed comprising as many units or repeats of the delivering and sending apparatus as may be desired. A longitudinally slidable carrier receiving shelf of the kind above described is arranged in each of the channels and is operatively disposed adjacent to one of the banks of dispatch terminals respectively, the shelves being ordinarily so arranged that all carriers moving in one channel will stop directly in front of one of the operator's stations, while carriers moving in the other channel will be permitted to pass such station and be arrested at the next station.

In Fig. 9 a modified arrangement of the trough structure is shown wherein the side walls of the trough are indicated 4ª, 5ª respectively, and a divider or partition 10ª separates the trough into two parallel channels into which the delivery ends of terminals such as 150, 160 discharge their carriers. As here shown, instead of a single belt forming the floor of the trough, separate belts 60, 61 are employed to form the floors of the respective channels, and such an arrangement may be desirable in any form of the apparatus although it is preferred in general to employ a single belt, such as is shown in Fig. 8 and above described.

Referring to the structure shown in Figs. 1 and 2, it being assumed that operators are seated at the stations 20, and 21, 20ª, 21ª, etc. one of the movable shelves 29, for example that one associated with the channel 11, is slid along its guideways until it is positioned before the operator at the station 20, while the shelf in the opposite channel 12 is moved in front of the operator at the station 21. All carriers arriving through the row 15 of terminals and falling upon the belt move along the channel 11 until they ride up the incline of the shelf and come to rest upon the latter in front of the operator or operators at the station 20 and immediately beneath the bank of dispatch terminals 17. The operator or operators at the station 20 may pick up all carriers as they come to rest upon the shelf and after performing the necessary transactions, whether cash or credit, may return them to the sending points through terminals of the bank 17. Likewise all carriers arriving through the terminals of row 16 are moved by the belt along the channel 12 until they ride up onto the shelf 29 in front of the operator's station 21, and after performing the desired transactions the operator or operators at station 21 return the carriers to the sending points without undue effort or relaying them to a dispatch operator. If the volume of business should decrease so that a single operator could handle all the carriers arriving at the bank 15, the operator may seat herself at a point substantially midway between the banks 17, 18 of dispatch terminals as for example at the station 22. Both shelves 29 are now slid along the channels to a point opposite the operator and stop all carriers whether in one channel or the other at a point within reach of the operator at this station. Having performed the necessary transaction the operator may with slight effort place the carrier in its proper terminal of either of the banks 17, 18 for return to the sending point. If the volume of business should increase substantially over the normal amount, it is obvious that an operator may be disposed at either side of the desk opposite either of the banks of dispatch terminals, or that several operators may be located at each of the stations.

If for any reason it should be desirable to have the credit transactions performed by special operators at some other desk or another part of the same desk, the credit carriers may be placed in the delivery dispatch terminal 23 for delivery to the authorizer wherever located, and after the authorization has been performed the carrier is returned through the tube 24, and then dispatched by the operator at the central station desk to the sending point. Carriers arriving through the rows of terminals 15ª and 16ª are likewise cared for by operators located at the stations 20ª, 21ª, 22ª, etc. If at any time it should be desired temporarily to dispense with the shelves or recesses, they may be slid along to the terminal ends of their respective channels.

By reason of the location of all operators at a central point, supervision is facilitated, and but little confusion is occasioned by the shifting of operators from station to station when necessary. As no separating devices need be employed for separating the arriving carriers into special groups or classes, the apparatus may be installed in almost any situation regardless of the head room available, and as the invention may be embodied in central station apparatus comprising any desired number of desk units each of greater or less longitudinal extent, general application and utility is not interfered with by any necessary disposition of the apparatus.

I claim:

1. A central station for carrier dispatch systems comprising a desk and a plurality of operators' stations spaced longitudinally of the desk, conveyor means adapted to move carriers in a plurality of independent streams longitudinally of the desk and past the operators' stations, means for delivering cash and credit carriers to said conveyor means, all carriers moving in either stream being within convenient reach of operators at any of said stations, and a bank of dispatch terminals within convenient reach of an operator at each of said stations.

2. A central station for carrier dispatch systems comprising a desk, a plurality of operators' stations spaced longitudinally of the desk, a bank of dispatch terminals within convenient reach of each of said stations, a bank of delivery terminals consisting of a plurality of groups of terminals corresponding respectively to each bank of dispatch terminals, said groups being spaced apart transversely of the desk, and means for moving carriers from the respective groups toward the corresponding banks of dispatch terminals.

3. A central station apparatus comprising a desk having operators' stations disposed centrally of its length, a bank of delivery terminals at each end of the desk, each bank consisting of a plurality of parallel rows of terminals, means for conveying carriers from each row of terminals in an independent stream toward the central part of the desk, and a bank of dispatch terminals corresponding to each of said rows of delivery terminals, one of said banks being arranged within convenient reach of each operator's station.

4. A central station for carrier dispatch systems comprising an operator's station, a plurality of groups of delivery terminals, each terminal discharging carriers of a plurality of distinct classes, means for moving all carriers delivered by the said terminals to a position where they are within convenient reach of the operator's station, means for keeping the carriers which are discharged from each group of terminals separate from others while so moving, and a bank of dispatch terminals corresponding to each group of delivery terminals, one such bank of dispatch terminals being within convenient reach of each operator's station.

5. A central station for carrier dispatch systems comprising a bank of delivery terminals disposed in two substantially parallel, elongated rectilinear rows, and a bank of dispatch terminals corresponding respectively to each of said rows of delivery terminals, the dispatch terminals of each bank being disposed in parallel rows of less longitudinal extent than the rows of delivery terminals, and means for moving carriers discharged from the delivery terminals to a point such that they may conveniently be introduced into the corresponding dispatch terminals by a seated operator.

6. A central station apparatus comprising an operator's station, two spaced banks of dispatch terminals arranged adjacent to said station, a dispatch terminal independent of said banks of terminals, said latter dispatch terminal being located between said banks of terminals for receiving carriers of a special class for transmission to another station, means for moving a stream of carriers past said first station, and means for stopping carriers within convenient reach of said station.

7. A central station apparatus comprising a belt conveyor for moving carriers of various kinds in a common predetermined path, a bank of dispatch terminals arranged adjacent to and above said path, at least one operator's station being arranged within convenient reach of the bank of dispatch terminals and of carriers moving in said path, and a delivery and a dispatch terminal for special carriers arranged adjacent to the aforesaid bank of dispatch terminals and within reach of the operator's station or stations.

8. A central station apparatus comprising means adapted to move mingled cash and credit carriers in a stream past an operator's station and within convenient reach of the latter, a bank of dispatch terminals adjacent to and within convenient reach of the operator's station, means for stopping all carriers at a point adjacent to the operator's station, and means independent of said dispatch terminals and within convenient reach of the operator at such station for conveying credit carriers away from the operator's station.

9. A central station apparatus comprising means for moving carriers in a predetermined path, and means adjustable longitudinally of said path for receiving and stopping such carriers in the order of their arrival, at selectively variable points in said path.

10. A central station apparatus comprising means for moving carriers in an open channel having operators' stations disposed at spaced intervals along it, and means for arresting all carriers at a point within said channel adjacent to a selected one of said stations without diverting the carriers from said channel.

11. A central station for carrier dispatch systems comprising a plurality of operators' stations, means for moving carriers in independent paths past said operators' stations, and means for selectively arresting carriers moving in either of said paths at either of the operator's stations without diverting the arrested carriers from their respective paths.

12. A central station apparatus comprising a plurality of operators' stations, means adapted to move carriers in independent streams past both stations and within convenient reach of each, and means for arresting all carriers in either or both streams and for retaining such arrested carriers at a point such that they are all within reach of an operator at one of said stations.

13. A central station apparatus comprising a conveyer for moving carriers in a predetermined path, operators' stations spaced longitudinally of said path and within convenient reach thereof, and a movable arresting device adapted optionally to be disposed at either of said stations for engaging carriers and bringing them to rest.

14. A central station apparatus comprising a conveyer belt, a plurality of delivery terminals discharging carriers onto the belt, and a carrier arresting device adjustable longitudinally of the belt and comprising means for diverting carriers from the belt and for supporting such diverted carriers.

15. A central station apparatus comprising a conveyer belt, a plurality of delivery terminals for discharging carriers onto the belt, a plurality of banks of dispatch terminals, and an arresting device adjustably movable longitudinally of the belt from one of said banks of terminals to the other and constructed and arranged to bring the carriers to rest at whatever point it is placed.

16. A central station apparatus comprising an elongate open channel, means for moving carriers along the channel, the side walls of the channel having grooves therein, and a shelf slidably engaging the grooves in the opposite walls of the channel and adapted to receive carriers moving along the channel and to bring them to rest.

17. A central station apparatus comprising a conveyer belt, means for delivering carriers onto the belt, and a shelf adjustable longitudinally of the belt and having an inclined end portion terminating closely adjacent to the upper surface of the belt to scrape carriers from the latter.

18. A central station apparatus comprising an elongate open trough, a conveyer forming the floor of the trough, means for depositing carriers upon said conveyer, a shelf within the trough above the floor thereof, said shelf terminating at that end thereof opposed to approaching carriers, in a downwardly inclined portion up which carriers may ride, and terminating at its other end in an upstanding stop shoulder.

19. A central station apparatus comprising an elongate open trough, a conveyer forming the floor of the trough, and a shelf adjustable longitudinally within the trough and having a downwardly inclined end portion terminating closely adjacent to the upper surface of the conveyer, said end portion being bifurcated by a centrally disposed notch.

20. A central station apparatus comprising a plurality of substantially like desk units, each unit having a plurality of rows of delivery terminals spaced from its central portion, a bank of dispatch terminals intermediate the ends of the desk unit corresponding to each of the rows of delivery terminals, each bank of dispatch terminals comprising a plurality of rows of terminals all within convenient reach of an operator stationed adjacent to said bank, and means for directing carriers delivered from the delivery terminals toward the station of the operator.

21. A central station apparatus comprising a plurality of substantially like desk units, each desk unit being provided with a plurality of parallel rows of delivery terminals disposed adjacent to one of its ends, each of said terminals delivering carriers of a plurality of classes, a bank of dispatch terminals comprising a terminal corresponding to each of the delivery terminals of one of said rows, said bank of dispatch terminals being disposed within convenient reach of an operator stationed adjacent to the mid-portion of the desk, and means for directing all carriers delivered by said terminals toward the mid-portion of the desk.

22. A central station apparatus comprising a plurality of desk units, certain at least of said units being furnished with longitudinally extending conveyor belts, an operator's station at each of said latter desk units, a bank of dispatch terminals within reach of each operator's station, said bank comprising a plurality of parallel rows of terminals, a row of delivery terminals for each unit, each terminal delivering carriers of a plurality of classes and corresponding to one of the dispatch terminals of the aforesaid bank, the conveyor belt transferring the carriers from the delivery terminals to a point within convenient reach of the operator's station.

23. A central station apparatus comprising a plurality of like desk units each having a belt conveyor extending longitudinally thereof and substantially midway of its width, a bank of dispatch terminals having their inlet openings disposed above the plane of the conveyor, means for delivering carriers to the conveyor, and an operator's station at either side of each unit, each station being within convenient reach of carriers on the conveyor and of the bank of dispatch terminals of the corresponding unit.

Signed by me at Syracuse, N. Y., this second day of April, 1923.

JOHN A. BAUER.